US009486982B2

(12) United States Patent
Emslander et al.

(10) Patent No.: US 9,486,982 B2
(45) Date of Patent: Nov. 8, 2016

(54) METHOD OF MANUFACTURING ADHESIVE ARTICLES

(75) Inventors: Jeffrey O. Emslander, Stillwater, MN (US); Danny L. Fleming, Stillwater, MN (US); George J. Clements, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 366 days.

(21) Appl. No.: 13/140,043

(22) PCT Filed: Dec. 18, 2009

(86) PCT No.: PCT/US2009/068632
§ 371 (c)(1),
(2), (4) Date: Sep. 12, 2011

(87) PCT Pub. No.: WO2010/080567
PCT Pub. Date: Jul. 15, 2010

(65) Prior Publication Data
US 2011/0316203 A1 Dec. 29, 2011

Related U.S. Application Data

(60) Provisional application No. 61/139,009, filed on Dec. 19, 2008.

(51) Int. Cl.
| | |
|---|---|
| B32B 7/12 | (2006.01) |
| B32B 27/08 | (2006.01) |
| B32B 27/32 | (2006.01) |
| C09J 7/02 | (2006.01) |
| B32B 25/08 | (2006.01) |
| B32B 25/12 | (2006.01) |
| B32B 25/14 | (2006.01) |
| B32B 25/18 | (2006.01) |
| B32B 27/16 | (2006.01) |
| B32B 27/20 | (2006.01) |
| B32B 27/22 | (2006.01) |
| B32B 27/26 | (2006.01) |
| B32B 27/28 | (2006.01) |
| B32B 27/30 | (2006.01) |
| B32B 27/36 | (2006.01) |
| B32B 27/40 | (2006.01) |

(52) U.S. Cl.
CPC ............... *B32B 7/12* (2013.01); *B32B 25/08* (2013.01); *B32B 25/12* (2013.01); *B32B 25/14* (2013.01); *B32B 25/18* (2013.01); *B32B 27/08* (2013.01); *B32B 27/16* (2013.01); *B32B 27/20* (2013.01); *B32B 27/22* (2013.01); *B32B 27/26* (2013.01); *B32B 27/283* (2013.01); *B32B 27/30* (2013.01); *B32B 27/308* (2013.01); *B32B 27/32* (2013.01); *B32B 27/327* (2013.01); *B32B 27/36* (2013.01); *B32B 27/40* (2013.01); *C09J 7/0246* (2013.01); *C09J 7/0271* (2013.01); *B32B 2307/518* (2013.01); *B32B 2307/71* (2013.01); *B32B 2307/72* (2013.01); *B32B 2307/748* (2013.01); *B32B 2405/00* (2013.01); *C09J 2423/005* (2013.01); *C09J 2433/00* (2013.01); *C09J 2453/005* (2013.01)

(58) Field of Classification Search
USPC .......... 264/173.19, 130, 464, 623, 638, 510, 264/514, 518, 171.21, 171.23, 171.27, 264/171.28, 173.11, 173.12, 173.14, 264/173.16, 176.1, 240, 241
See application file for complete search history.

(56) References Cited

U.S. PATENT DOCUMENTS

| | | | |
|---|---|---|---|
| RE24,906 E | 12/1960 | Ulrich | |
| 3,823,211 A * | 7/1974 | Colombo | ............ 4/209.3 |
| 4,181,752 A | 1/1980 | Martens | |
| 4,379,806 A * | 4/1983 | Korpman | ........ C09J 7/0264 |
| | | | 156/244.11 |
| 4,418,120 A | 11/1983 | Kealy | |
| 4,535,113 A | 8/1985 | Foster | |
| 4,582,736 A * | 4/1986 | Duncan | ............ 428/41.4 |
| 4,737,559 A | 4/1988 | Kellen | |
| 5,141,790 A | 8/1992 | Calhoun | |
| 5,407,971 A | 4/1995 | Everaerts | |
| 5,660,922 A | 8/1997 | Herridge | |
| 5,728,469 A * | 3/1998 | Mann et al. | ............ 428/41.8 |
| 5,804,610 A | 9/1998 | Hamer | |
| 5,807,632 A | 9/1998 | Pedginski | |
| 5,817,386 A | 10/1998 | Adamko | |
| 5,948,517 A | 9/1999 | Adamko | |
| 6,294,249 B1 | 9/2001 | Hamer | |

(Continued)

FOREIGN PATENT DOCUMENTS

| | | |
|---|---|---|
| EP | 0742814 | 11/1996 |
| EP | 1278632 | 2/2006 |

(Continued)

OTHER PUBLICATIONS

Satas, Handbook of Pressure Sensitive Adhesives, (1989).
International Search Report for PCT/US2009/054322, mailed Apr. 1, 2010, 5 pages.
International Search Report for PCT/US2009/068632, mailed Aug. 9, 2010, 3 pages.
Supplementary European Search Report for Application No. EP 09 83 7359, dated Jan. 23, 2015.

*Primary Examiner* — Stella Yi
(74) *Attorney, Agent, or Firm* — Philip Y. Dahl

(57) ABSTRACT

The present application is directed to a method of manufacturing an adhesive article. The method comprises providing a first extrudable feedstock comprising a pressure sensitive adhesive and providing a second extrudable feedstock comprising a polyolefin polymer having a density of no greater than 0.91 g/cc. The first extrudable feedstock and the second extrudable feedstock are coextruded in contact with each other to form a coextruded film. The method also comprises cooling the coextruded film.

13 Claims, No Drawings

(56) References Cited

U.S. PATENT DOCUMENTS

| | | |
|---|---|---|
| 6,348,249 B2 | 2/2002 | Meyer |
| 6,369,123 B1 | 4/2002 | Stark |
| 6,589,636 B2 | 7/2003 | Emslander |
| 6,777,053 B1 | 8/2004 | Günter |
| 6,818,311 B2 | 11/2004 | Guenter |
| 6,875,502 B2 | 4/2005 | Guenter |
| 6,919,405 B2 | 7/2005 | Kinning |
| 6,921,729 B2 | 7/2005 | Schwab |
| 6,982,107 B1 | 1/2006 | Hennen |
| 7,371,464 B2 * | 5/2008 | Sherman et al. ............. 428/447 |
| 7,501,184 B2 | 3/2009 | Leir |
| 7,648,608 B2 | 1/2010 | Guenter |
| 2001/0009706 A1 * | 7/2001 | Meyer .......................... 428/41.8 |
| 2003/0032715 A1 | 2/2003 | Sakaitani |
| 2003/0049436 A1 * | 3/2003 | Hager et al. .................. 428/343 |
| 2003/0060546 A1 | 3/2003 | Moskala et al. |
| 2003/0118770 A1 * | 6/2003 | Suwa et al. .................. 428/41.5 |
| 2003/0226637 A1 * | 12/2003 | David et al. .................. 156/212 |
| 2004/0013838 A1 | 1/2004 | Guenter |
| 2004/0127121 A1 | 7/2004 | Schwab |
| 2005/0048302 A1 | 3/2005 | Sakurai |
| 2005/0186373 A1 * | 8/2005 | Rhee et al. .................. 428/35.7 |
| 2005/0196574 A1 | 9/2005 | Nonaka |
| 2005/0271851 A1 | 12/2005 | Shibatou et al. |
| 2006/0194043 A1 | 8/2006 | Nishiyama |
| 2007/0065620 A1 | 3/2007 | Nonaka |
| 2007/0077421 A1 | 4/2007 | Grefenstein |
| 2007/0082161 A1 | 4/2007 | Cruz |
| 2007/0104913 A1 | 5/2007 | Nonaka |
| 2009/0312483 A1 * | 12/2009 | Kitson .......................... 524/505 |
| 2010/0183881 A1 * | 7/2010 | Yasui et al. .................... 428/421 |
| 2011/0143134 A1 | 6/2011 | Emslander |

FOREIGN PATENT DOCUMENTS

| | | |
|---|---|---|
| JP | 55-034249 | 3/1980 |
| JP | 58-038778 | 3/1983 |
| JP | 59-122570 | 7/1984 |
| JP | 2000-063770 | 2/2000 |
| JP | 2001-81424 | 3/2001 |
| JP | 2003-013014 | 1/2003 |
| JP | 2004-346213 | 12/2004 |
| JP | 2007-332204 | 12/2007 |
| WO | WO 95-13331 | 5/1995 |
| WO | WO 95/20635 | 8/1995 |
| WO | WO 9938930 | 5/1999 |
| WO | WO 02/081586 | 10/2002 |
| WO | WO 2008/001768 | 1/2008 |
| WO | WO 2008-095967 | 8/2008 |

* cited by examiner

METHOD OF MANUFACTURING ADHESIVE ARTICLES

CROSS REFERENCE TO RELATED APPLICATIONS

This application is a national stage filing under 35 U.S.C 371 of PCT/US2009/068632, filed Dec. 18, 2009, which claims priority to US Provisional Patent Application No. 61/139009, filed Dec. 19, 2008, the disclosure of which is incorporated by reference in its/their entirety herein.

FIELD

The present application is directed to a method for manufacturing adhesive articles.

BACKGROUND

Adhesive articles, including pressure sensitive adhesive articles, have many uses. Generally it is known to manufacture adhesive articles with a layer of adhesive, and generally with a backing. In some adhesive articles, the article also comprises a liner on the adhesive, opposite the backing.

The backing and/or the liner generally comprise a release agent. Release agents are well known in the pressure sensitive adhesive tape industry to provide a release surface so that a tape can be unwound from a roll without the adhesive sticking to the backside of the tape or the surface of the liner.

SUMMARY

Generally, co-extrusion of an adhesive layer with a layer comprising release agents has not been done because the adhesive and the release layer fail to actually effectively release from one another. The present application is directed to a method of manufacturing an adhesive article.

The method comprises providing a first extrudable feedstock comprising a pressure sensitive adhesive and providing a second extrudable feedstock comprising a polyolefin polymer having a density of no greater than 0.91 g/cc. The first extrudable feedstock and the second extrudable feedstock are coextruded in contact with each other to form a coextruded film. The method also comprises cooling the coextruded film.

The coextruded film comprises an adhesive layer comprising the pressure sensitive adhesive and a release layer comprising the polyolefin polymer having a density of no greater than 0.91 g/cc. In specific embodiments, the method further comprises removing the first layer from the second layer. In some embodiments, the polyolefin is a block copolymer. In other embodiments, the polyolefin is made using a metallocene catalyst.

DETAILED DESCRIPTION

The present application is directed to a method of manufacturing an adhesive article. The adhesive article is manufactured using extrusion technology, by coextruding a first extrudable feedstock in contact with a second extrudable feedstock to form a coextruded film. The first extrudable feedstock comprises a pressure sensitive adhesive. The second extrudable feedstock comprises a polyolefin polymer having a density of no greater than 0.91 g/cc. The coextruded film then comprises an adhesive layer comprising the pressure sensitive adhesive and a release layer comprising the polyolefin polymer having a density of no greater than 0.91 g/cc.

In some embodiments, additional feedstocks are added on one or both sides of the first or second feedstock. For example, a third extrudable feedstock may be used to make a film on the adhesive layer opposite the release layer. Such a layer may be, for example, a graphic film such as polyvinyl chloride or an olefinic graphic film substrate like that described in U.S. Pat. No. 6,589,636—Emslander, etal) or a tape backing such as ethylene acrylic acid copolymer or another layer comprising a release agent. Additional layers could include films used as labelstock, graphic protection films and antigraffiti films.

Extrusion Technology

Coextrusion is a known method of manufacturing films. Coextrusion means, for the present application, the simultaneous melt processing of multiple molten streams and the combination of such molten streams into a single unified structure, or coextruded film, for example from a single extrusion die, for example cast extrusion and blown film extrusion. Adhesive articles have been manufactured with extrusion technology as shown, for example, in U.S. Pat. No. 5,660,922 (coextruding double sided adhesive tapes) and U.S. Pat. No. 6,777,053. It is also known to extrude release material blends to form a release film. See, for example, U.S. Patent Application 2004-0127121. Blown film processes generally result in a tube that is later collapsed. The tube may then be separated into two films (for example by slitting) or may result in a single film (for example if the inner most layer self bonds).

The process is run generally by processing the feedstocks at or above their melt temperature through the die, resulting in the coextruded film. A coextruded film is generally a composite of all the molten feedstocks placed within the co-extrusion process. The resulting co-extruded films are generally multilayer. The layers are in contact with one another in the molten state. In certain embodiments, the layers are in contact throughout the extrusion, for example they are in contact as soon as they are molten.

The coextruded film may further be processed, for example by orientation. One example of orientation of a film is biaxial orientation. Biaxial orientation involves stretching the film in two directions perpendicular to each other, generally in the down-web direction and cross-web direction. In a typical operation, the freshly extruded molten film is fed onto a chill roll to produce a quenched amorphous film which is briefly heated and stretched in the down-web direction, and then conducted through a tenter frame where it is stretched transversely with moderate heating. Down-web direction stretching may be accomplished by passing between two sets of nip rolls, the second set rotating at a higher speed than the first.

Adhesive Technology

Any adhesive that is extrudable is appropriate for the present application. Generally the adhesive is a pressure sensitive adhesive after cooling. The pressure sensitive adhesive may be, for example, an acrylic adhesive. The pressure sensitive adhesive may be tackified.

In some embodiments, the pressure sensitive adhesive is substantially free of silicones. For the purpose of the present application, "substantially free" means the pressure sensitive adhesive has less than 10% by weight of silicones, for example less than 5% by weight if silicones.

In some embodiments, the pressure sensitive adhesive is an acid containing acrylic pressure sensitive adhesive, for example 10% acid such as acrylic acid or less in the adhesive. In other embodiments, the pressure sensitive adhesive is a base containing acrylic pressure sensitive adhesive. The pressure sensitive adhesive may also be a conventional, or natural rubber pressure sensitive adhesive or a block-copolymer synthetic rubber pressure sensitive adhesive. Furthermore, the pressure sensitive adhesive component can be a single pressure sensitive adhesive or the pressure sensitive adhesive can be a combination of two or more pressure sensitive adhesives.

Pressure sensitive adhesives useful in the present application include, for example, those based on natural rubbers, synthetic rubbers, styrene block copolymers, polyvinyl ethers, poly (meth)acrylates (including both acrylates and methacrylates), polyolefins, and silicones.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, and curing agents.

Specific examples of suitable adhesive include acrylic acid containing pressure sensitive adhesives, such as those disclosed in WO 2002/081586 and U.S. Pat. No. 6,294,249.

Release Technology

The release layer comprises a release agent. The release layer may also comprise other polymers, blended with the release agent.

In the present application, the release agent comprises copolymers of ethylene and alpha-olefins having from 3 to about 10 carbon atoms and density no greater than 0.91 g/cc. Suitable alpha-olefins include 1-butene, 1-hexene, 1-octene, and combinations thereof. Copolymers of ethylene and octene-1 are preferred for use with acrylate-based pressure sensitive adhesives. The copolymers may be either block copolymers or non-block copolymers. In some embodiments, the copolymer has a density of no greater than 0.91 g/cc, for examples no greater than 0.89 g/cc. Suitable copolymers are commercially available from Dow Chemical Company, Midland, Mich., under the INFUSE tradenames and from ExxonMobil Chemical Company, Houston, Tex., under the EXACT tradenames. In some embodiments, the copolymer is polyolefin polymer made using a metallocene catalyst.

As stated above, the release agent may additionally be blended with other polymers to form the release layer. Examples of the polymers useful for blending with the release agent include other polyolefin polymers having a density of no greater than 0.91 g/cc; polyethylene (including low density polyethylene), polydiorganosiloxane polyoxamide copolymers, polypropylene and those polymers sold under the trade names Nucrel, Basell HL 456J, Vistamax, Bynel, and combinations thereof.

In some embodiments, at least the adhesive is subject to post extrusion processing, either in the coextruded film or after separation from the release liner. For example, the adhesive may be crosslinked. Crosslinking, sometimes also known as post curing, usually comprises exposing the coated material to some form of radiant energy, such as electron beam, or ultraviolet light with the use of a chemical crosslinking agent. Examples of useful crosslinkers include copolymerizable photoinitiators disclosed, for example, in U.S. Pat. Nos. 6,369,123 (Stark et al.), 5,407,971 (Everaerts et al.), and 4,737,559 (Kellen et al.). The copolymerizable photocrosslinking agents either generate free radicals directly or use hydrogen abstraction atoms to generate free radicals. Examples of hydrogen abstraction type photocrosslinkers include, for example, those based on benzophenones, acetophenones, anthraquinones, and the like. Examples of suitable copolymerizable hydrogen abstraction crosslinking compounds include mono-ethylenically unsaturated aromatic ketone monomers free of orthoaromatic hydroxyl groups. Examples of suitable free-radical generating copolymerizable crosslinking agents include but are not limited to those selected from the group consisting of 4-acryloxybenzophenone (ABP), paraacryloxyethoxybenzophenone, and para-N-(methacryloxyethyl)-carbamoylethoxybenzophenone. Copolymerizable initiators, when used, are typically included in the amount of about 0% to about 2%, or in the amount of about 0.025% to about 0.5%, based on the total monomer content.

Coextruded Film

The coextruded film is cooled after the extrusion, resulting in a multilayer film. In some embodiments, the multilayer film is then capable of being separated along the release layer/adhesive layer interface. The release force for such an embodiment, where the release layer acts as a release liner, is generally less than 190 g-force/inch (7 N/dm), for example 50 g-force/inch (1.9 N/dm), and in specific examples less than 40 g-force/inch (1.5 N/dm). In other embodiments, after cooling, the release layer acts as a tape backing with a low adhesion backsize ("LAB"). In such an embodiment, the adhesive is rolled on to the release layer. The release for such an embodiment, where the release layer is a low adhesion backsize, is generally less than 1100 g-force/inch (42 N/dm), for example less than 750 g-force/inch (29 N/dm) and in specific embodiments, less than 500 g-force/inch (19 N/dm).

EXAMPLES

These examples are merely for illustrative purposes only and are not meant to be limiting on the scope of the appended claims. All parts, percentages, ratios, etc. in the examples and the rest of the specification are by weight, unless noted otherwise.

| Abbreviation or Trade Designation | Description |
|---|---|
| AA | Acrylic acid monomer |
| IOA | Isooctyl acrylate monomer |
| AcAm | Acrylamide monomer |
| 2-EHA | 2-ethylhexyl acrylate |
| 2MBA | 2-methyl butyl acrylate |
| Irgacure 651 | 2,2-dimethoxy-2-phenylacetophenone from CIBA Corporation Tarrytown, NY |

| Abbreviation or Trade Designation | Description |
|---|---|
| Irgacure 184 | 1-Hydroxy-cyclohexyl-phenyl-ketone, from CIBA Corporation Tarrytown, NY |
| IOTG | Isooctyl thiolglycolate |
| ABP | Acryloxybenzophenone |
| Irganox 1076 | Antioxidant available from CIBA Corporation Tarrytown, NY |
| VA-24 | Ethylene vinyl acetate copolymer film of 0.0635 millimeters thickness available from Pliant Corporation, Dallas, TX |
| Foral 85 | Glycerol ester of hydrogenated rosin used as tackifier available from Hercules Incorporated, Wilmington, DE |
| Exxon 129.24 | Low density polyethylene resin with a density of 0.929 g/cc available from ExxonMobil Chemical Company, Houston, TX |
| EXACT 5181 | Metallocene catalyzed ethylene octene alpha olefin copolymers with a density of 0.882 g/cc available from ExxonMobil Chemical Company, Houston, TX |
| EXACT 8201 | Metallocene catalyzed ethylene octene alpha olefin copolymers with a density of 0.882 g/cc available from ExxonMobil Chemical Company, Houston, TX |
| PRIMACOR 1410 | PRIMACOR 1410 Copolymer is an ethylene acrylic acid copolymer from Dow Plastics |
| S Polymer | polydiorganosiloxane polyoxamide copolymer with a siloxane segment average molecular weight of about 25,000 g/mole, prepared as described in U.S. patent application No. 2007-0148474 |
| VECTOR 4111 | A linear styrene-isoprene-styrene triblock copolymer, having a low styrene content, low diblock content, and low modulus; produced via proprietary sequential anionic polymerization technology, Dexco Polymers LP, a Dow/ExxonMobil Venture, Houston, TX. |
| ELASTOLLAN ET-590 | A polyester based thermoplastic, polyurethane resin, BASF Japan, Limited, Tokyo, Japan |
| TAFMER™ A-4085S | An ethylene/alpha-olefin copolymer prepared using a metallocene catalyst, having a density of 0.885 g/cc, Mitsui Chemicals, Incorporated, Tokyo, Japan. |
| 3M™ Double Coated Tape Y-410 | A double coated adhesive tape having a paper backing and an adhesive layer containing a natural rubber adhesive. 3M Company, St. Paul, MN |
| 3M™ Single Coated Tape 851 | A single coated adhesive tape having a polyester film backing and an adhesive layer containing a blend of silicone and rubber. 3M Company, St. Paul, MN |

EXTRUDABLE PSA DESCRIPTIONS

PSA 1: Acrylic Acid Containing Acrylate PSA

A PSA composition was made by mixing 93 parts by weight IOA, 7 parts by weight AA, 0.15 parts by weight Irgacure 651, 0.10 parts by weight ABP, 0.05 parts by weight IOTG, and 0.4 parts by weight Irganox 1076. The PSA composition was placed into packages made of a VA-24 film measuring approximately 10 centimeters by 5 centimeters and heat sealed. The composition was polymerized as described in U.S. Pat. No. 5,804,610.

PSA 2: Tackified Acrylic Acid Containing Acrylate PSA

A PSA composition was made by mixing 93 parts by weight IOA, 7 parts by weight AA, 0.15 parts by weight Irgacure 651, 0.10 parts by weight ABP, 0.05 parts by weight IOTG, and 0.4 parts by weight Irganox 1076. The PSA composition was placed into packages made of a VA-24 film measuring approximately 10 centimeters by 5 centimeters and heat sealed. The composition was polymerized as described in U.S. Pat. No. 5,804,610. The polymerized PSA was melt blended by conventional means with 14 parts by weight Foral 85 to form a ribbon of tackified PSA of approximately 5 centimeters in width and ½ centimeter thick. The ribbon was formed for ease of handling and feeding to the feed throat of the extruders used to generate the examples.

PSA 3: Acrylamide Based Acrylic PSA

A pressure sensitive adhesive composition having a composition of 96 wt-% 2-methylbutyl acrylate and 4 wt-% acrylamide was provided by heating a ca. 50% solids solvent solution of the monomers and a thermal initiator. Next, 0.6 wt-% benzophenone was added to the resulting polymer solution. This polymer solution had an intrinsic viscosity of ca. 0.57 dL/g in ethyl acetate at 27° C. Next, the polymer solution was stripped of solvent to provide a solid mass that was employed in the extrusion process.

PSA 4: Acrylic Acid Containing Acrylate PSA

A PSA composition was made by mixing 96.3 parts by weight 2-EHA, 3.5 parts by weight AA, 0.19 parts by weight Irgacure 184, 0.075 parts by weight ABP, and 0.05 parts by weight IOTG. The PSA composition was placed into packages made of a VA-24 film measuring approximately 10 centimeters by 5 centimeters and heat sealed. The composition was polymerized as described in U.S. Pat. No. 5,804,610.

Release Test 1

The working platen of an INSTRUMENTORS, Inc. Slip/Peel tester Model 3M90A was covered with 3M Brand double coated adhesive tape. A test sample of a linered tape construction having a width of 2.54 cm and a nominal length of 25 cm was positioned on the surface of the working platen such that the release layer was in contact with the exposed surface of the double coated tape.

A 2.3-kg rubber roller was rolled back and forth two times over the test sample. The combined backing and pressure sensitive adhesive (PSA) layers were then peeled back from the release layer at a rate of 2.3 meters/minute (90 inches/minute) over a five second data collection time. Three samples were tested and the average of the three individual average release forces was reported. All tests were done in a facility at constant temperature (70° C.) and constant humidity (50% RH) unless noted. Measurements were obtained in g/inch and converted to N/dm.

Release Test 2

The lower release layer of a sample of a linered tape construction, having a width of 2 centimeters (cm) and a nominal length of 10 cm, was positioned such that it was in contact with one adhesive side of a double coated adhesive tape (3M™ Y-410 Double Coated Tape, Sumitomo 3M, Japan) and rolled down using a 2 kilogram (kg) rubber roller. Next, the reinforcing polyester release film was removed from the outer release layer of the linered tape construction and a piece of reinforcing single coated tape (3M™ Single Coated Tape 851, 3M Company, St. Paul, Minn.) was placed over the exposed release layer and rolled down as described above. The protective liner of the double coated tape was then removed and the exposed adhesive surface placed on the working platen of a SHIMADZU Autograph Model AG-X (100N) followed by rolling the rubber roller back and forth two times over the resulting laminate construction. The single coated tape-reinforced outer release layer of the laminate construction was then peeled back at an angle of 180° at a peel rate of 30 cm/minute, and data was collected for about 15 seconds. Results were obtained in Newtons (N)/2 cm and converted to N/cm. Two samples were evaluated and their average reported. All tests were run at 23° C. and 65% Relative Humidity, unless otherwise noted.

Shear Test

Shear strength was evaluated at 70° C. using a stainless steel panel and a 500 gram (gm) weight as follows. The release layer reinforced with silicone treated polyester film was removed from a sample of a linered tape construction having a width of about 2 cm and a nominal length of about 10 cm. A 25 micrometer thick polyester film ("EMBLET", available from Unitika Limited, Osaka, Japan) was laminated onto the exposed adhesive layer to form a linered single side pressure sensitive adhesive (PSA) tape. This tape was then cut into strips having a width of 1.2 cm and a nominal length of 10 cm, and the remaining release layer removed. The resulting test strip was adhered in lengthwise contact to a stainless steel substrate (SUS panel, available from Nihon Tact Company, Limited, Tokyo, Japan) such that the tape sample covered an area measuring 2.5 cm by 1.2 cm and there was sufficient excess tape extending beyond the edge of the substrate to form a loop. Then a 2 kg rubber roller was rolled back and forth once over the resulting test panel to ensure intimate and consistent contact. The excess tape extending beyond the edge of the substrate was wrapped around a metal hook and then onto itself, adhesive to adhesive, and secured by stapling to secure the hook and provide the test sample. The test sample was then transferred to a fixture, in a oven at 70 C, and positioned such that panel was disposed at an angle of 2 degrees to the vertical with the free end of the tape extended downward at an angle of 178 degrees to the test panel. After conditioning for 15 minutes a 500 g weight was hung on the hook and the time until the weight dropped was measured. Two samples were evaluated and the average shear time in minutes was reported.

EXAMPLES

| Example Number | Inside Layer | PSA Middle Layer | Outside Layer | Release* in N/cm | Release in g-force/inch |
|---|---|---|---|---|---|
| Comp. Ex. A | Primacor 1410 | PSA-1 | Exxon 129.24 | 0.74 | 192 |
| Comp Ex. B | Primacor 1410 | PSA-3 | Exxon 129.24 | 1.34 | 348 |
| 1 | Primacor 1410 | PSA-1 | Exact 5181 | 0.099 | 25.6 |
| 2 | Primacor 1410 | PSA-1 | Exact 8201 | 0.078 | 20.3 |
| 3 | Primacor 1410 | PSA-2 | Exact 5181 | 0.11 | 28.7 |
| 4 | Primacor 1410 | PSA-3 | Exact 5181 | 0.12 | 32.5 |
| 5 | Exact 5181 | PSA-1 | Exact 8201 | 0.092 | 23.8 |
| 6 | None | PSA-1 | Exact 8201 | 0.16 | 41 |
| 7 | Exxon 129.24 | PSA-1 | Exact 8201 | 0.093 | 24 |
| 8 | Primacor 1410 | PSA-1 | 90% Exact 5181 and 10% S Polymer | 0.11 | 27.4 |
| 9 | Primacor 1410 | PSA-2 | 90% Exact 5181 and 10% S Polymer | 0.11 | 29.2 |
| 10 | Primacor 1410 | PSA-3 | 90% Exact 5181 and 10% S Polymer | 0.13 | 32.5 |
| 11 | Elastollan ET-590:VECTOR 4111/95:5 (w:w) | PSA 4 | Tafmer A-4085S | 0.51** | 90.7 |
| 12 | Elastollan ET-590:VECTOR 4111/95:5 (w:w) | PSA 4 | Tafmer A-4085S | 0.17 | 38.9 |

*Examples 1-10 and Comparative Examples A and B were evaluated for release force using "Release Test 1". Examples 11 and 12 were evaluated for release force using "Release Test 2".
**Partial adhesive transfer was observed during separation of the release layer The difference between Examples 11 and 12 was the thickness of the individual layers, as shown in the table below.

| | Layer Thickness (micrometers) | | | |
|---|---|---|---|---|
| Ex. | Inner (Backing) (total, estimated) | Middle (PSA) (per layer, estimated) | Outer (Release) (per layer) | Release Force (N/cm) | Shear at 70° C. (minutes) |
| 11 | 89 | 18 | 50 | 0.51* | N.T. |
| 12 | 47 | 22 | 47 | 0.17 | 10 |

*Partial adhesive transfer was observed during separation of the release layer
N.T. = not tested

Examples 1, 2, 3, 4, 8, 9, 10 and Comp. Examples A and B

A blown film process employing a 3 layer, 2 inch diameter annular die was used to generate a 3 layered tubular coextruded film with an inside backing layer, a middle PSA layer, and an outside release layer. Each layer was fed through a ¾ inch diameter Brabender extruder.

Temperature profiles for each example are given below. A die temperature of 182 C was used for all examples given below.

Comparative Example A

Outside layer extruder barrel zone temperature profile: 160° C., 170° C., 180° C.
Middle layer extruder barrel zone temperature profile: 150° C., 170° C., 175° C.
Inside layer extruder barrel zone temperature profile: 160° C., 170° C., 180° C.

Comparative Example B

Outside layer extruder barrel zone temperature profile: 160° C., 175° C., 185° C.
Middle layer extruder barrel zone temperature profile: 140° C., 150° C., 165° C.
Inside layer extruder barrel zone temperature profile: 160° C., 170° C., 180° C.

Example 1

Outside layer extruder barrel zone temperature profile: 160° C., 170° C., 180° C.
Middle layer extruder barrel zone temperature profile: 155° C., 170° C., 180° C.
Inside layer extruder barrel zone temperature profile: 160° C., 170° C., 180° C.

Example 2

Outside layer extruder barrel zone temperature profile: 160° C., 175° C., 185° C.
Middle layer extruder barrel zone temperature profile: 130° C., 160° C., 180° C.
Inside layer extruder barrel zone temperature profile: 160° C., 170° C., 180° C.

Example 3

Outside layer extruder barrel zone temperature profile: 160° C., 175° C., 185° C.
Middle layer extruder barrel zone temperature profile: 140° C., 150° C., 160° C.
Inside layer extruder barrel zone temperature profile: 160° C., 170° C., 180° C.

Example 4

Outside layer extruder barrel zone temperature profile: 160° C., 175° C., 185° C.
Middle layer extruder barrel zone temperature profile: 140° C., 150° C., 160° C.
Inside layer extruder barrel zone temperature profile: 160° C., 170° C., 180° C.

Example 8

Outside layer extruder barrel zone temperature profile: 160° C., 175° C., 185° C.
Middle layer extruder barrel zone temperature profile: 155° C., 170° C., 180° C.
Inside layer extruder barrel zone temperature profile: 160° C., 170° C., 180° C.

Example 9

Outside layer extruder barrel zone temperature profile: 160° C., 175° C., 18° C.
Middle layer extruder barrel zone temperature profile: 140° C., 150° C., 160° C.
Inside layer extruder barrel zone temperature profile: 160° C., 170° C., 180° C.

Example 10

Outside layer extruder barrel zone temperature profile: 160° C., 175° C., 185° C.
Middle layer extruder barrel zone temperature profile: 140° C., 150° C., 160° C.
Inside layer extruder barrel zone temperature profile: 160° C., 170° C., 180° C.

For the examples described above, the resulting tubular coextruded blown films were collapsed to form a flat tube approximately 6 inches (15.2 cm) wide. The collapsed tube was then rolled up on a 3 inch (7.6 cm) paper core. The 3 coextruded layers formed a linered tape construction where the inside layer of the collapsed blown film tube was the tape backing, the middle layer was the PSA that bonded to the inside tape backing layer, and the outside layer was a release film that released from the PSA layer. The inside and outside layers were approximately 2 mils (50 micrometers) thick and the core adhesive layer was approximately 1 mil (25 micrometers) thick.

A section of the collapsed coextruded film of approximately 2 feet (61 cm) in length was irradiated through the outside layer by passing it twice under a medium pressure Hg lamp for a total dose of 100 mJ/cm$^2$ UVC as measured by an EIT Power PUCK radiometer (EIT Incorporated, Sterling, Va.).

Example 5

A blown film was provided as described for the examples above using the temperature profiles given below.
Outside layer extruder barrel zone temperature profile: 160° C., 175° C., 185° C.
Middle layer extruder barrel zone temperature profile: 130° C., 160° C., 180° C.

Inside layer extruder barrel zone temperature profile: 160° C., 170° C., 180° C.
Die temperature 182 C.

The resulting tubular coextruded blown film was collapsed and crosslinked as described in the examples above to form a double linered adhesive transfer tape construction. After removing one of the release layers from the PSA, the resulting PSA/release layer article was then applied to a substrate with the PSA and substrate in contact with each other, and rubbed down using hand pressure. The release layer still attached to the PSA was then removed resulting in an exposed PSA layer on a substrate. The inside and outside layers were approximately 2 mils (50 micrometers) thick and the middle adhesive layer was approximately 1 mil (25 micrometers) thick.

Example 6

A blown film was provided as described for the examples above using the temperature profiles given below.
Outside layer extruder barrel zone temperature profile: 160° C., 170° C., 180° C.
Middle layer extruder barrel zone temperature profile: 155° C., 170° C., 180° C.
Inside layer extruder barrel zone temperature profile: Not used—extruder shut off.
Die temperature 182° C.

After producing a stable bubble, the inside extruder was shut off resulting in a 2 layer bubble of adhesive (inside) and Exact 8201 on the outside. The bubble was collapsed at the nip to form a flat tube approximately 6 inches (15.2 cm) wide. During the collapsing operation the inside adhesive layer of was contacted to itself, forming a continuous adhesive film that could not be separated with a release liner on each side of the adhesive layer. The resulting construction was a double linered adhesive transfer tape. The collapsed tube was then rolled up on a 3 (7.6 cm) inch paper core. A section of the collapsed coextruded film of approximately 2 feet (61 cm) in length was crosslinked as described in the examples above. After removing one of the release layers from the PSA, the resulting PSA/release layer article was then applied to a substrate with the PSA and substrate in contact with each other, and rubbed down using hand pressure. The release layer still attached to the PSA was then removed resulting in an exposed PSA layer on a substrate. The release layers were approximately 2 mils (50 micrometers) thick and the adhesive layer was approximately 1 mil (25 micrometers) thick.

Example 7

A blown film was provided as described for the examples above using the temperature profiles given below.
Outside layer extruder barrel zone temperature profile: 160° C., 175° C., 185° C.
Middle layer extruder barrel zone temperature profile: 130° C., 160° C., 180° C.
Inside layer extruder barrel zone temperature profile: 160° C., 170° C., 180° C.
Die temperature 182° C.

The resulting tubular coextruded blown film was collapsed and crosslinked to provide a double linered adhesive transfer tape construction which was applied to a substrate, all as described in Example 5 above.

Examples 11 and 12

A blown film process employing a 3 layer, 2 inch diameter annular die was used to generate a 3 layered tubular coextruded film with an inside backing layer, a middle PSA layer, and an outside release layer. The backing and release layers were fed through a 20 mm diameter single screw extruders. The PSA layer was fed through a 20 mm diameter twin screw extruder. The backing feed material was prepared by dry mixing the backing resin components and a red pigmented olefin blend (45 wt. % red pigment) in a plastic bag in a weight ratio of 95:5:1/Vector 4111: Elastollan ET-590: pigmented olefin blend. The release layer feed material was prepared by dry mixing the release resin component and a blue pigmented olefin blend (20 wt. % blue pigment) in a plastic bag in a weight ratio of 100:1. The difference between Examples 11 and 12 was the extruder screw speed for the inner (backing) layer, as shown below.

Temperature profiles for each example are given below.
A die temperature of 200° C. was used for the two examples given below.

Example 11

Outside layer extruder barrel zone temperature profile: 175° C., 230° C., 230° C.
Middle layer extruder barrel zone temperature profile: 120° C., 120° C., 120° C.
Inside layer extruder barrel zone temperature profile: 175° C., 200° C., 210° C.

|  | Inner Backing | Middle PSA | Outer Release |
| --- | --- | --- | --- |
| Extruder Screw Speed (rpm) | 60 | 30 | 60 |

Example 12

Outside layer extruder barrel zone temperature profile: 175° C., 230° C., 230° C.
Middle layer extruder barrel zone temperature profile: 120° C., 120° C., 120° C.
Inside layer extruder barrel zone temperature profile: 175° C., 200° C., 210° C.

|  | Inner Backing | Middle PSA | Outer Release |
| --- | --- | --- | --- |
| Extruder Screw Speed (rpm) | 30 | 30 | 60 |

For examples 11 and 12 described above, the resulting tubular coextruded blown films were collapsed to form a flat tube approximately 30 cm (ca. 12 inches) wide. The collapsed tube was then laminated to the silicone treated side of a reinforcing polyester release film and rolled up on a 7.6 cm (3 inch) diameter paper core. The three coextruded layers formed a linered double coated tape construction where the inner self-bonded layers formed the tape backing, the middle layer was the PSA layer that bonded to the inside tape backing layer, and the outer layer was a release film that released from the PSA layer. The combined thickness of the collapsed backing and PSA layers was measured since they could not be readily separated, and the individual thickness of the collapsed backing layer and each adhesive layer was estimated based on the extruder screw speeds for these two materials.

These examples are merely for illustrative purposes only and are not meant to be limiting on the scope of the appended claims. All parts, percentages, ratios, etc. in the examples and the rest of the specification are by weight, unless noted otherwise.

Various modifications and alterations of the present invention will become apparent to those skilled in the art without departing from the spirit and scope of the invention.

What is claimed is:

1. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polvolefin polymer having a density of no greater than 0.91 g/cc additionally blended with other polymers;
   coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and
   cooling the coextruded film;
   wherein the pressure sensitive adhesive or tackified pressure sensitive adhesive includes between 0.5 wt % and about 10 wt % acrylic acid monomer.

2. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polvolefin polymer having a density of no greater than 0.91 g/cc additionally blended with other polymers;
   coextruding the first extrudabie feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and
   cooling the coextruded film;
   wherein the pressure sensitive adhesive or tackified pressure sensitive adhesive is an acid containing acrylic pressure sensitive adhesive.

3. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polyolefin polymer having a density of no greater than 0.91 g/cc additionally blended with other polymers;
   coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and
   cooling the coextruded film;
   wherein the second extrudable feedstock further comprises polyurethane.

4. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polyolefin polymer having a density of no greater than 0.91 g/cc additionally blended with other polymers;
   coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and
   cooling the coextruded film;
   wherein the second extrudable feedstock further comprises polylactic acid.

5. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polyolefin polymer having a density of no greater than 0.91 g/cc additionally blended with other polymers;
   coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and
   cooling the coextruded film;
   wherein the second extrudable feedstock further comprises a polydiorganosiloxane polyoxamide copolymer.

6. A method of manufacturing an adhesive article comprising:
   providing a first extrudable feedstock comprising a pressure sensitive adhesive or a tackified pressure sensitive adhesive, wherein the pressure sensitive adhesive or tackified pressure sensitive adhesive is an acrylic adhesive;
   providing a second extrudable feedstock consisting essentially of a polyolefin polymer having a density of no greater than 0.91 g/cc or a polvoiefin polymer having a density of no greater than 0.91 g/cc additionally blended with other polymers;
   coextruding the first extrudable feedstock in contact with the second extrudable feedstock to form a coextruded film including an adhesive layer including the first extrudable feedstock and a release layer including the second extrudabie feedstock, wherein coextruding comprises processing the feedstocks at or above their melt temperature; and cooling the coextruded film;

wherein coextruding additionally comprises a third extrudable feedstock in contact with the first extrudable feedstock opposite the second extrudable feedstock.

7. A method of manufacturing an adhesive article comprising:

providing a first extrudable feedstock comprising a pressure sensitive adhesive or a tackified pressure sensitive adhesive, wherein the pressure sensitive adhesive or tackified pressure sensitive adhesive is an acrylic adhesive;

providing a second extrudable feedstock consisting essentially of a polyolefin polymer having a density of no greater than 0.91 g/cc or a polyolefin polymer having a density of no greater than 0.91 g/cc additionally blended with other polymers;

coextruding the first extrudable feedstock in contact with the second extrudable feedstock, and a third extrudable feedstock in contact with the first extrudable feedstock opposite the second extrudable feedstock, to form a coextruded film including an adhesive layer including the first extrudable feedstock and a release layer including the second extrudable feedstock, wherein coextruding comprises processing the feedstocks at or above their melt temperature; and; and cooling the coextruded film;

wherein the co-extrusion step is a blown film step.

8. The method of claim 7, wherein a tube is formed in the blown film step, and the method comprising collapsing the tube after the coextruding step.

9. The method of claim 8, wherein the third extrudable feedstock is an inner most layer in the tube, and the inner most layer self bonds to form a film.

10. A method of manufacturing an adhesive article comprising:

providing a first extrudable feedstock comprising a pressure sensitive adhesive or a tackified pressure sensitive adhesive, wherein the pressure sensitive adhesive or tackified pressure sensitive adhesive is an acrylic adhesive;

providing a second extrudable feedstock consisting essentially of a polyolefin polymer having a density of no greater than 0.91 g/cc or a polyolefin polymer having a density of no greater than 0.91 g/cc additionally blended with other polymers;

coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and cooling the coextruded film;

wherein the co-extrusion step is a blown film step;

further comprising separating the release layer and the adhesive layer.

11. A method of manufacturing an adhesive article comprising:

providing a first extrudable feedstock comprising a pressure sensitive adhesive or a tackified pressure sensitive adhesive, wherein the pressure sensitive adhesive or tackified pressure sensitive adhesive is an acrylic adhesive;

providing a second extrudable feedstock consisting essentially of a polyolefin polymer having a density of no greater than 0.91 g/cc or a polyolefin polymer having a density of no greater than 0.91 g/cc additionally blended with other polymers;

coextrudina the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and cooling the coextruded film;

wherein the co-extrusion step is a blown film step, wherein a tube is formed in the blown film step, and the method comprising collapsing the tube after the coextruding step;

further comprising separating the release layer and the adhesive layer.

12. A method of manufacturing an adhesive article comprising:

providing a first extrudable feedstock comprising a pressure sensitive adhesive or a tackified pressure sensitive adhesive, wherein the pressure sensitive adhesive or tackified pressure sensitive adhesive is an acrylic adhesive;

providing a second extrudable feedstock consisting essentially of a polyolefin polymer having a density of no greater than 0.91 g/cc or a polvolefin polymer having a density of no greater than 0.91 g/cc additionally blended with other polymers;

coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and cooling the coextruded film;

wherein the co-extrusion step is a blown film step; wherein the adhesive article is capable of being separated along a release layer/adhesive layer interface.

13. A method of manufacturing an adhesive article comprising:

providing a first extrudabie feedstock comprising a pressure sensitive adhesive or a tackified pressure sensitive adhesive, wherein the pressure sensitive adhesive or tackified pressure sensitive adhesive is an acrylic adhesive;

providing a second extrudable feedstock consisting essentially of a polyolefin polymer having a density of no greater than 0.91 g/cc or a polvolefin polymer having a density of no greater than 0.91 g/cc additionally blended with other polymers;

coextruding the first extrudable feedstock in contact with the second extrudable feedstock to form a coextruded film including an adhesive layer including the first extrudable feedstock and a release layer including the second extrudable feedstock, wherein coextruding comprises processing the feedstocks at or above their melt temperature; and cooling the coextruded film;

wherein the co-extrusion step is a blown film step, wherein a tube is formed in the blown film step, and the method comprising collapsing the tube after the coextruding step;

wherein the adhesive article is capable of being separated along a release layer/adhesive layer interface.

* * * * *

UNITED STATES PATENT AND TRADEMARK OFFICE
CERTIFICATE OF CORRECTION

| | | |
|---|---|---|
| PATENT NO. | : 9,486,982 B2 | Page 1 of 1 |
| APPLICATION NO. | : 13/140043 | |
| DATED | : November 8, 2016 | |
| INVENTOR(S) | : Emslander et al. | |

It is certified that error appears in the above-identified patent and that said Letters Patent is hereby corrected as shown below:

In the Specification

Column 1
Line 10, delete "61/139009," and insert -- 61/139,009, --

Column 2
Line 10, delete "etal)" and insert -- et al.) --

In the Claims

Column 13
Line 17, in Claim 1, delete "polvolefin" and insert -- polyolefin --
Line 40, in Claim 2, delete "polvolefin" and insert -- polyolefin --
Line 43, in Claim 2, delete "extrudabie" and insert -- extrudable --

Column 14
Line 62, in Claim 6, delete "polvolefin" and insert -- polyolefin --

Column 15
Line 2, in Claim 6, delete "extrudabie" and insert -- extrudable --
Line 28, in Claim 6, delete "and; and" and insert -- and --

Column 16
Line 4, in Claim 11, delete "coextrudina" and insert -- coextruding --
Line 27, in Claim 12, delete "polvolefin" and insert -- polyolefin --
Line 43, in Claim 13, delete "extrudabie" and insert -- extrudable --
Line 49, in Claim 13, delete "polvolefin" and insert -- polyolefin --

Signed and Sealed this
Twenty-third Day of May, 2017

Michelle K. Lee
*Director of the United States Patent and Trademark Office*